United States Patent Office 3,284,318
Patented Nov. 8, 1966

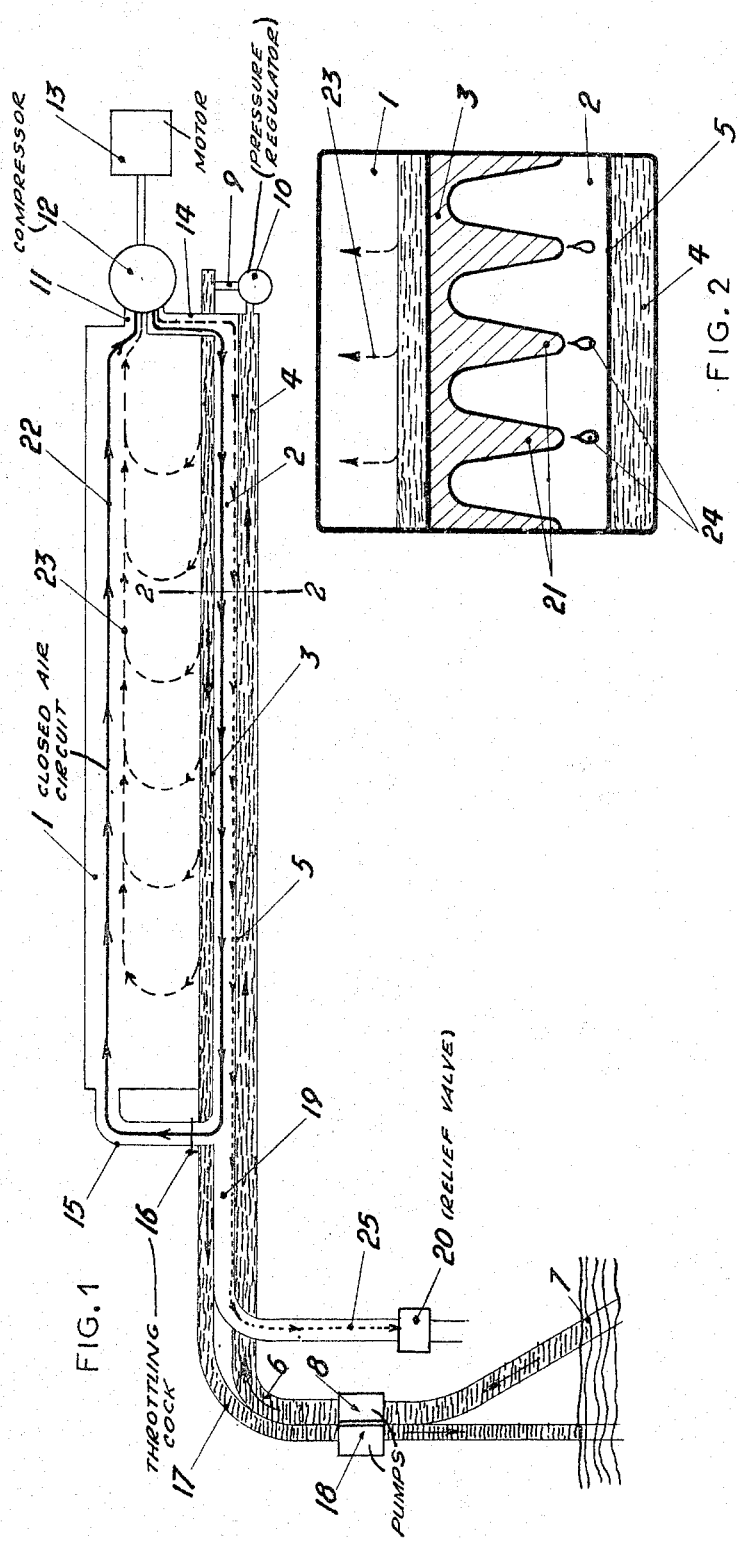

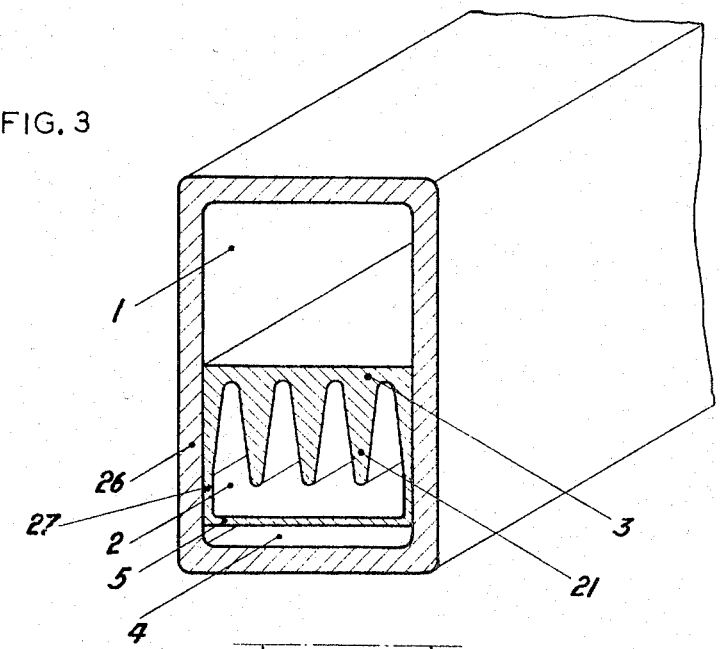
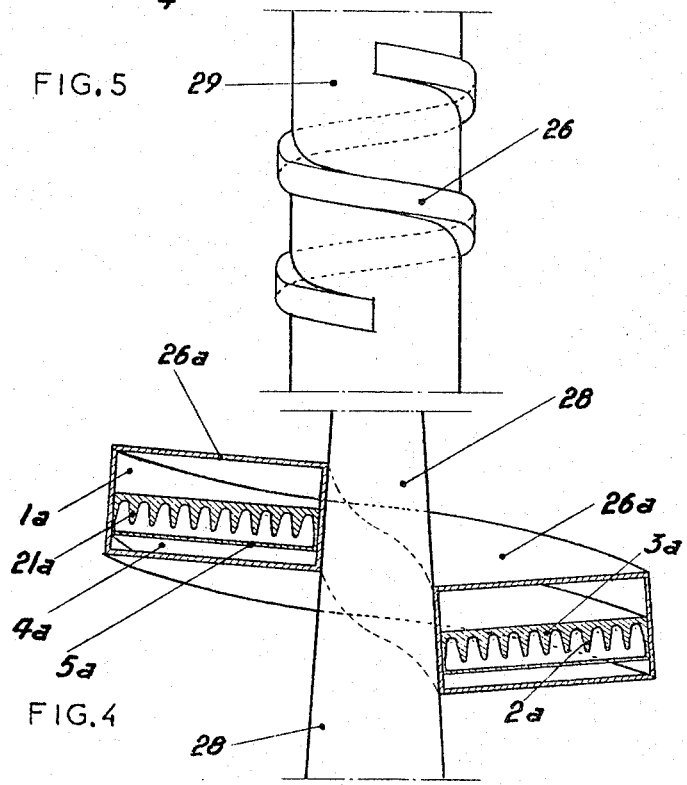

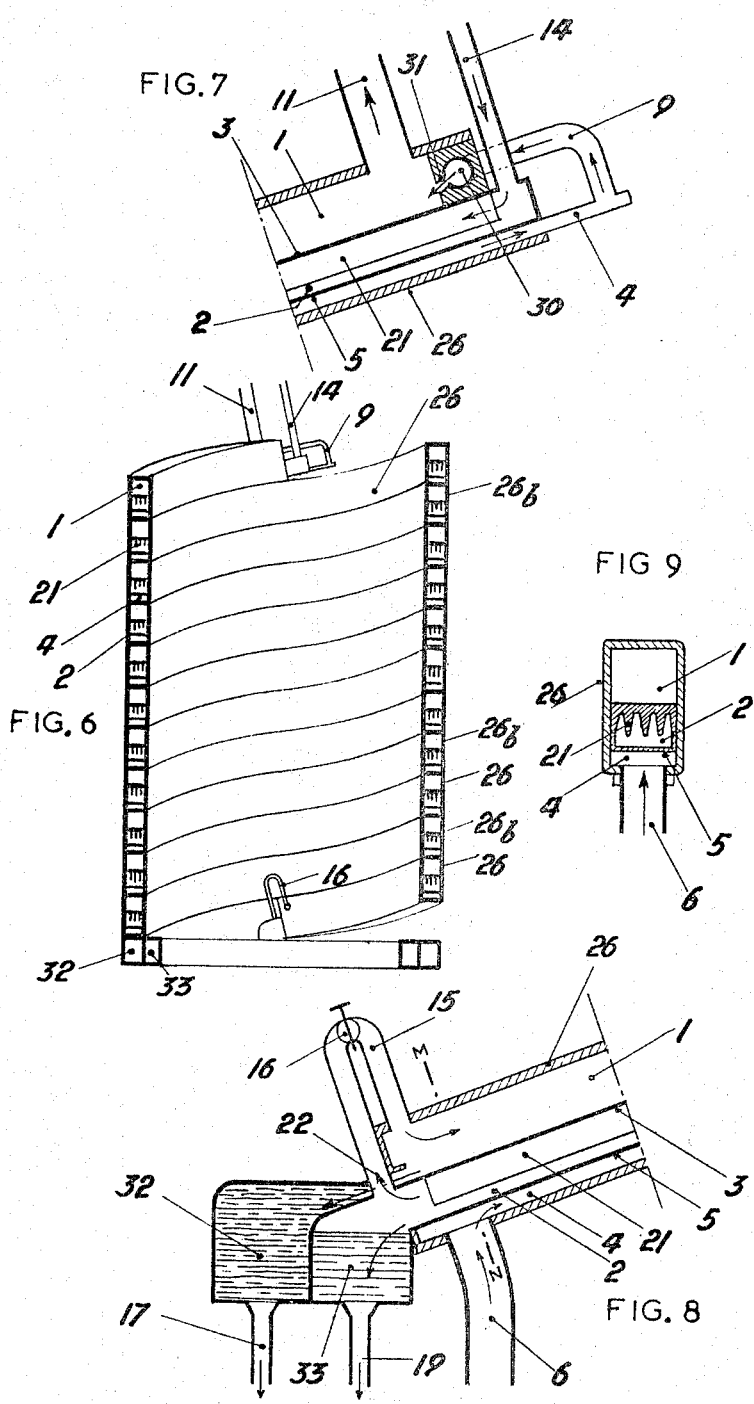

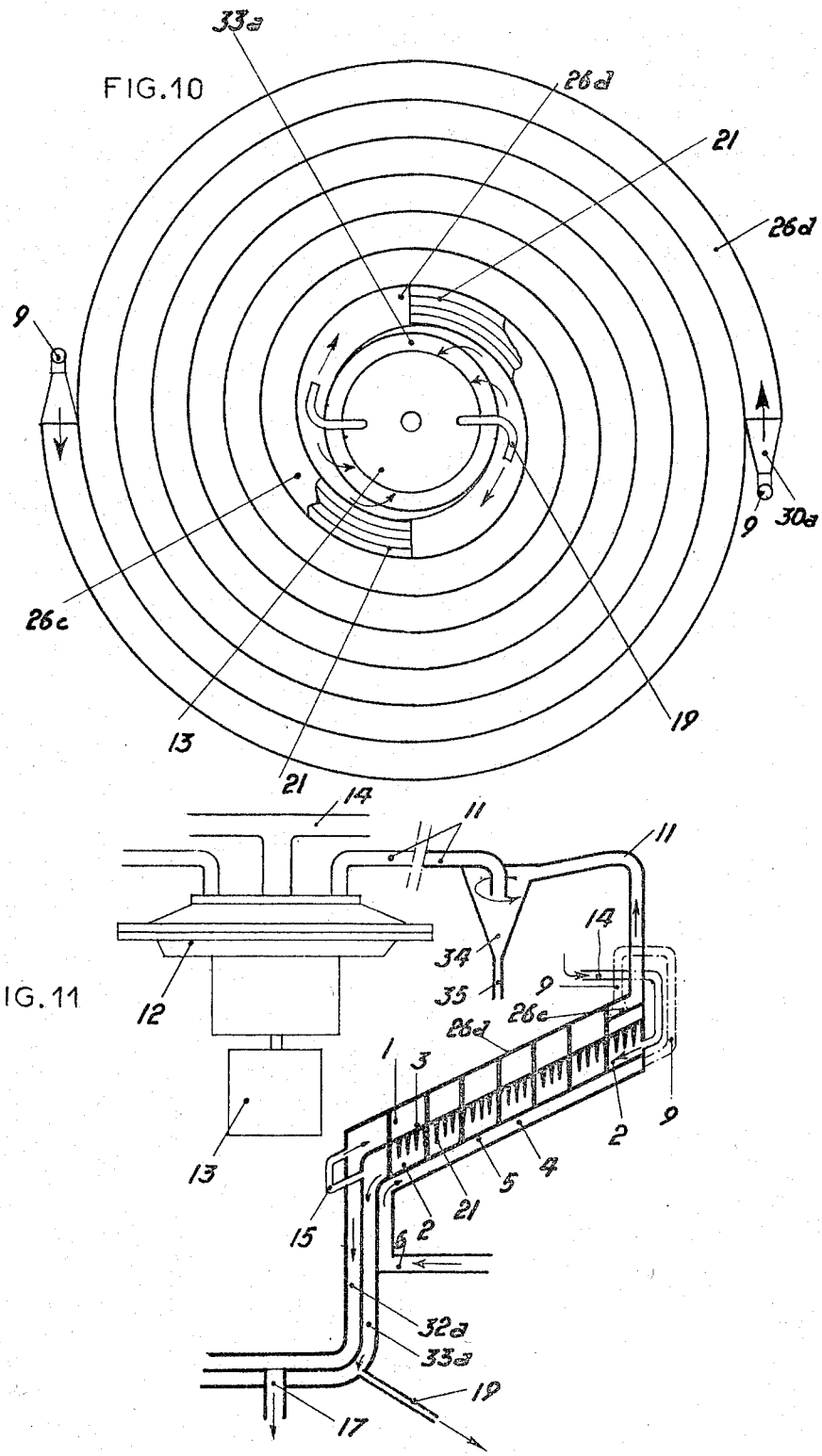

3,284,318
APPARATUS FOR RECOVERING HEAT RELEASED BY CONDENSATION OF A VAPORIZED LIQUID
Henri Coanda and Marguerite H. Coanda, both of 81 Blvd. Saint Michel, Paris, France
Filed Dec. 27, 1962, Ser. No. 247,725
Claims priority, application France, Dec. 30, 1961, 883,577
5 Claims. (Cl. 202—160)

This invention relates to the direct recovery of the calories released by the condensation of a previously vaporized liquid, particularly for the purpose of contributing to the vaporization of additional amounts of liquid.

The apparatus of the invention has the advantages of being remarkably simple and very efficient.

The apparatus of the invention has at least one elongated evaporation chamber and at least one elongated condensation chamber, the chambers being superimposed and having a common wall forming the bottom of the first and the top of the second over which the evaporating liquid flows in the evaporation chamber, said wall being of a good thermal conductor and having, in the condensation chamber, a number of depending appendages or projections that narrow as they approach the bottom of the chamber whereby the surface area of the common wall in the condensation chamber is increased and there are formed a series of drips; means to cause the liquid to be evaporated to flow in one direction in the evaporation chamber; means producing a reduced pressure in the evaporation chamber and an elevated pressure in the condensation chamber, whereby air, in the manner of a closed circuit, is caused to flow successively through the evaporation chamber against the flow of liquid and through the condensation chamber; and means for withdrawing the condensed liquid at the lower part of the condensation chamber.

The appendages that form the drips preferably take the form of parallel longitudinal ribs, continuous or non-continuous, having a cross section in the shape of a wedge with a small included angle and a lower edge that is advantageously rounded. Instead of ribs, there likewise can be used, for example, appendages or projections in the shape of stalactites, separated from each other and preferably having rounded points. The distance between the lower edge or point of these appendages and the wall forming the bottom of the condensation chamber should be such that a drop of liquid forming at this edge or point quickly contacts the layer of condensed liquid flowing over this bottom.

The combination formed by the evaporation and condensation chambers is so arranged that the chambers are slightly inclined along their entire lengths and, in order to reduce the size, that the chambers are twisted in the manner of a helix about a real or imaginary cylindrical or conical surface.

To ensure that the desired reduced pressure is maintained in the evaporation chamber, the inlet of the latter for the recycled air coming from the condensation chamber consists of a nozzle, preferably adjustable, permitting a sufficient reduction of the pressure. Likewise, the liquid that is to be evaporated is introduced into the evaporation chamber by one or more nozzles of small cross section, such as one or more narrow slits, which also ensure that the liquid shall be spread over the bottom of the evaporation chamber. The liquid remaining after evaporation can be withdrawn by a pump, unless the apparatus is sufficiently under load so that the required suction is automatically created.

Several embodiments of the invention, as applied to apparatus for obtaining fresh water from sea water or other kinds of salty and/or polluted water, shall now be described, with reference to the accompanying drawings, in which:

FIGURE 1 schematically shows the circulation of air and water in an embodiment of the invention;

FIGURE 2 is a view in section, taken along line 2—2 of FIGURE 1, showing the arrangement of chambers in the tubular member;

FIGURE 3 is a perspective view of the hollow tubular member and the associated chambers;

FIGURE 4 is a view in section of such a member wound as a helix about a conical surface;

FIGURE 5 is a view in lateral elevation showing such a member wound about a cylindrical surface;

FIGURE 6 is a view in vertical section of two tubular members wound about a surface of revolution;

FIGURE 7 is a view in longitudinal section and on expanded scale of the inlet of a tubular member of FIGURE 6;

FIGURE 8 is a similar view of the outlet for the same tubular member;

FIGURE 9 is a view in section taken on line M–N of FIGURE 8;

FIGURE 10 is a top view, partly broken away, showing another embodiment using two tubular members;

FIGURE 11 diagrammatically shows, in vertical section, the embodiment of FIGURE 10.

As shown in FIGURE 1, the apparatus includes an evaporation chamber 1 and a condensation chamber 2. These chambers are superimposed and contiguous, the common wall 3 acting as the bottom of chamber 1 and as the ribbed top of chamber 2. A chamber 4 for heating the water extends beneath chamber 2 and has therewith a common wall 5 acting as the top of chamber 4 and the bottom of chamber 2. The walls 3 and 5 are made of a material, such as aluminum or copper, that is an excellent thermal conductor.

At one end, the heating chamber 4 is supplied with a feed pipe 6 that is immersed in the reservoir 7 holding the water that is to be purified. For the purpose of simplification, and not to be taken in limitation thereof, this water to be purified shall hereinafter be designated "sea water." A pump 8 in pipe 6 pumps the sea water into chamber 4, which is connected to the evaporation chamber 1 by a pipe 9 having a pressure regulator 10 of any known and desirable design.

At the end connected to pipe 9, the evaporation chamber 1 has an air suction pipe 11 opening into a compressor 12—driven by a motor 13—that blows into the condensation chamber 2 through a conduit 14. At the other end, chamber 1 is connected to chamber 2 by a pipe 15 having an adjustable throttling cock 16. The same end of chamber 1 has a pipe 17, with a pump 18, for withdrawing the remaining sea water; and chamber 2 has a pipe 19, with a relief valve 20, for withdrawing the fresh water.

In accordance with one feature of the invention, wall 3, separating chambers 1 and 2, has, on the chamber 2 side, a number of parallel longitudinal ribs 21 (FIGURES 2 and 3) that act as drips.

The operation cycle of the described apparatus shall now be set forth.

The pump 8 sucks up the sea water from the reservoir 7 through pipe 6, where it is pumped into chamber 4 and heated in contact with the upper wall 5 of the chamber. It then flows through pipe 9 into the evaporation chamber 1, where, after partial evaporation, it is sucked through pipe 17 by pump 18 and evacuated.

The air, the circulation of which forms the closed circuit of solid line 22, with the arrows indicating the direction of flow, is sucked by compressor 12 into the evaporation chamber 1, which has a somewhat reduced pressure. The air takes on the pure water vapor coming from the evaporation of the sea water (the vapor path and direction being indicated by the broken line and arrows 23). The moisture laden air is pumped into chamber 2, where the water vapor condenses on contacting the large surface area of the drips 21, that is conductively cooled by the water in chamber 1 cooled by evaporation. The condensed fresh water runs down the sides of the drips 21 to form drops 24 at the tips. Because of the very small spacing between a tip and the bottom 5 of chamber 2, a drop touches the layer of fresh water running along the bottom 5, thereby encouraging its fall to form and feed this layer of water. A portion of the heat of the layer is conducted through bottom 5 to the sea water flowing through the heating chamber 4. The fresh water, of which the path and direction are shown by the dotted lines and arrows 25, flows into pipe 19.

Consequently, it will be seen that, in the cycle, because of the reduced pressure maintained by compressor 12 and because of the various relief valves and supply pumps maintaining the desired elevated or reduced pressures, the vapor laden air as it flows through the chamber 2—where, at an elevated pressure, the vapor is precipitated out of the air—returns, through walls 3 and 5, to the sea water that is in, or flowing towards, chamber 1 the heat taken from the sea water because of the evaporation in chamber 1.

As shown in FIGURE 3, the combination of three chambers 1, 2, and 4 can be formed within a hollow tubular member 26 having a rectangular cross section and made of a poor thermal conductor, such as rubber of a similar material, and having located interior of it a second hollow tubular member 27 made of a good thermal conductor, such as aluminum or copper, forming the walls 3 and 5 respectively separating chambers 1 and 2 and 2 and 4. The surface of wall 3 facing the chamber 2 is shaped to provide the desired drips 21.

The combination of FIGURE 3 can be made wider than it is high, as shown in FIGURE 4, whereby the number of drips 21 and the surface area of walls 3 and 5 is increased. The combination, the elements of which have the same reference numeral as in FIGURE 3, but with an added a, can advantageously twist in the manner of a helix about either a conical surface 28 (FIGURE 4) or a cylindrical surface 29 (FIGURE 5). These surfaces can be real and constructed of metal as a separate entity or be imaginary and defined by the lateral internal wall of hollow member 26 or 26a.

With the conical surface (FIGURE 4), the wall 3a forming the bottom of the evaporation chamber 1a is desirably slightly inclined towards the central axis, thereby promoting, under the action of centrifugal force, a uniform distribution of the evaporating sea water flowing down chamber 1a, while the sea water fed in flows up chamber 4a.

Whether the hollow member 26 or 26a twists about a cylinder or a cone, the pitch can be such that several such members twist simultaneously about the same surface. Thus, FIGURE 6 shows two hollow members 26 and 26b superimposed to form a cylinder.

FIGURES 7, 8, and 9, show the arrangement of the feed, connecting, and withdrawal pipes of chambers 1, 2, and 4. The chamber 4 of each helix formed by a hollow member 26 or 26a is connected to a pipe 6 (FIGURES 8 and 9). The sea water that is to be desalted is fed through this pipe into chamber 4 where it flows up to the top of the apparatus and through pipe 9 into a small collector extending across the top of chamber 1 and having an outlet slot 31, which simultaneously assures that the water is spread over the bottom 3 of the chamber and that the pressure is regulated. The sea water flows down chamber 1, partially evaporating. The unevaporated water flows into an annular collector 32 located at the bottom of the apparatus. The water thence flows into pipe 17 connected to a pump 18 (FIGURE 1). The air in the chamber laden with vapor from the evaporation of the sea water is sucked into tube 11 and thence conveyed by tube 14 into chamber 2, where, as already described, the vapor condenses on the drips 21, drips to the bottom 5, flows down to the base of the apparatus, pours into an annular collector 33, and is withdrawn through pipe 19. The dehumidified air passes through conduit 22, an adjustable relief valve 16, and conduit 15 into the base of the chamber 1, where it once again sweeps upwardly over the sea water flowing down. It will be understood that by having feeding and connecting means at the top and bottom of the apparatus for each of the tubular members 26 and 26a, the annular collectors 32 and 33 can be made common to these members.

The member 26 can also form a spiral, so as to form an inverted cone, as shown in FIGURES 10 and 11, where two hollow members 26c and 26d, having the cross section of a parallelogram, are wound side by side. To simplify the drawing, only one side of the arrangement is shown in FIGURE 11. In this embodiment, the hollow members 26c and 26d have only an evaporation chamber 1 and a condensation chamber 2, the feed chamber 4 extending under the whole of the bottom 5 of chamber 2. This embodiment uses the same parts as those of the preceding figures, except that the means for collecting the unevaporated sea water and fresh water are members 32a and 33a, respectively, located at the base of 26c and 26d and common thereto and that a means, of the kind called a "cyclone," is associated with pipe 11 between the evaporation chamber 1 and the suction of compressor 12, the latter consisting of a membrane pump. The cyclone removes the tiny droplets of fresh water suspended in the moisture laden air. The water thus collected passes through pipe 35 to join that flowing through pipe 19.

The sea water enters the space 4, located under the bottom of the condensation chamber 2, through pipe 6. The sea water then flows through pipes 9 and distributors or spreaders 30a, of the same kind as the spreader 30 of FIGURE 7, into chambers 1 where it flows down against the air sucked up by the compressor 12. While the unevaporated sea water is withdrawn through 32a, the vapor laden air enters the cyclones 34 where it is freed of the water already condensed. The compressor 12 then blows the air into the condensation chambers 2 where the remaining moisture is removed by condensation, before the air is returned to the chambers 1. The fresh water condensed on the drips 21 flows towards the base of the chambers 2, where it is collected by 33a and withdrawn through pipe 19.

The cocks, valves, and relief valves, being well known to those skilled in the art, are not described or illustrated in detail.

Further, it being obvious to those skilled in the art that the scope of the invention admits of many modifications, the foregoing explanation is illustrative and not limitative.

What we claim is:

1. Apparatus for recovering the heat released by the condensation of a vapor, comprising means defining at least one pair of chambers, said chambers comprising a first enclosed chamber for evaporating a liquid to produce said vapor and a second enclosed chamber for condensing said vapor, said chambers of said pair having a common, heat-conducting wall between them; said wall defining one side of each of said chambers; means on the second chamber side of said common wall for increasing the surface area thereof and for promoting the formation of drops of liquid from the condensed vapor; first means for supplying said liquid to said first chamber at one end thereof, whereby a portion of the depth of said chamber is filled with liquid; second means for discharging the unevaporated portion of said liquid from the other end of said first chamber; third means including air pump means for creating a partial vacuum in said first chamber and connecting said pair of chambers at one end thereof and fourth means including a pressure regulating means therein connecting said pair of chambers at the other ends thereof, whereby gas is sucked through said first chamber and blown into said second chamber and drawn once again into said first chamber; fifth means for collecting the liquid condensed in said second chamber, said pair of chambers being elongated and sloped whereby said one end is elevated above said other end, and said pair of chambers being configured to twist about a surface of revolution.

2. The apparatus of claim 1, wherein said surface of revolution is a cone and said pair of chambers are inclined towards the axis of said cone.

3. The apparatus of claim 2, wherein said means defining said chambers define two pairs of said chambers.

4. The apparatus of claim 3, wherein said two pairs of chambers define an inverted cone.

5. The apparatus of claim 4, including sixth means cooperatively associated with said third means for removing the moisture condensed in said gas before it enters said second chamber, and seventh means for conveying said water to said fifth means.

References Cited by the Examiner

UNITED STATES PATENTS

| | | | |
|---|---|---|---|
| 1,489,009 | 4/1924 | Rohmer et al. | 203—47 X |
| 1,529,233 | 3/1925 | Barbet | 202—75 X |
| 2,600,110 | 6/1952 | Hachmuth | 62—31 X |
| 3,096,255 | 7/1963 | Redenbaugh | 203—11 |
| 3,099,607 | 7/1963 | Lustenader et al. | 203—10 |

FOREIGN PATENTS 277,993   10/1930   Italy.

NORMAN YUDKOFF, *Primary Examiner.*

F. E. DRUMMOND, *Assistant Examiner.*